(12) United States Patent
Takabayashi et al.

(10) Patent No.: US 11,990,625 B2
(45) Date of Patent: May 21, 2024

(54) ELECTRODE CATALYST LAYER, MEMBRANE ELECTRODE ASSEMBLY, AND POLYMER ELECTROLYTE FUEL CELL

(71) Applicant: TOPPAN PRINTING CO., LTD., Tokyo (JP)

(72) Inventors: Yuki Takabayashi, Tokyo (JP); Kazuma Taniwaki, Tokyo (JP); Ayako Mimatsu, Tokyo (JP); Hiroyuki Michi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 469 days.

(21) Appl. No.: 17/358,393

(22) Filed: Jun. 25, 2021

(65) Prior Publication Data

US 2021/0320302 A1 Oct. 14, 2021

Related U.S. Application Data

(63) Continuation of application No. PCT/JP2019/051477, filed on Dec. 27, 2019.

(30) Foreign Application Priority Data

Dec. 28, 2018 (JP) ................................ 2018-247691
Jan. 18, 2019 (JP) ................................ 2019-007059

(Continued)

(51) Int. Cl.
*H01M 4/86* (2006.01)
*H01M 8/1004* (2016.01)

(52) U.S. Cl.
CPC ....... *H01M 4/8626* (2013.01); *H01M 8/1004* (2013.01)

(58) Field of Classification Search
CPC ............. H01M 4/8626; H01M 8/1004; H01M 4/8605; H01M 4/8673; H01M 4/8668
See application file for complete search history.

(56) References Cited

U.S. PATENT DOCUMENTS

2006/0093893 A1   5/2006   Matsuo et al.
2006/0204832 A1   9/2006   Mei et al.
(Continued)

FOREIGN PATENT DOCUMENTS

JP       3617237 B2    2/2005
JP     2007-194197 A   8/2007
(Continued)

OTHER PUBLICATIONS

European Extended Search Report, dated Jan. 11, 2022, issued in corresponding European Patent Application No. 19903782.1, (7 pages).

(Continued)

*Primary Examiner* — Stewart A Fraser
(74) *Attorney, Agent, or Firm* — Foley & Lardner LLP (57) ABSTRACT

An electrode catalyst layer includes a catalyst material, a conductive carrier, which supports the catalyst material, a polymer electrolyte, and a fibrous material. The electrode catalyst layer includes a three-dimensional network of a flow path. The flow path includes a plurality of terminal points and a plurality of branches. Each of the branches is an elongated hole connecting a pair of the terminal points. The plurality of branches include a bifurcated branch. One of the pair of the terminal points of the bifurcated branch is connected to another branch. The number of branches per unit volume of the electrode catalyst layer is 8500 or more and 13000 or less. The unit volume is defined as 3.9 μm×3.9 μm×4.4 μm.

9 Claims, 5 Drawing Sheets (30) Foreign Application Priority Data

Apr. 16, 2019 (JP) ................................. 2019-077905
Sep. 24, 2019 (JP) ................................. 2019-172731

(56) References Cited

U.S. PATENT DOCUMENTS

| | | | |
|---|---|---|---|
| 2009/0020734 A1* | 1/2009 | Jang ...................... | H01B 1/122 |
| | | | 252/519.34 |
| 2013/0224625 A1* | 8/2013 | Sumioka ................ | D21H 13/50 |
| | | | 429/482 |
| 2018/0108919 A1* | 4/2018 | Lu ........................ | H01M 4/9083 |
| 2020/0067104 A1* | 2/2020 | Kumaraguru ....... | H01M 8/1004 |
| 2020/0287221 A1* | 9/2020 | Iijima ................. | H01M 4/8817 |

FOREIGN PATENT DOCUMENTS

| | | |
|---|---|---|
| JP | 4037814 B2 | 1/2008 |
| JP | 2009-140764 A | 6/2009 |

OTHER PUBLICATIONS

International Searching Authority, "International Search Report," issued in connection with International Patent Application No. PCT/JP2019/051477, dated Mar. 17, 2020.

International Searching Authority, "Written Opinion," issued in connection with International Patent Application No. PCT/JP2019/051477, dated Mar. 17, 2020.

\* cited by examiner

ELECTRODE CATALYST LAYER, MEMBRANE ELECTRODE ASSEMBLY, AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/051477, filed on Dec. 27, 2019, which is based upon and claims the benefit of priority to Japanese Patent Application Nos. 2018-247691, filed on Dec. 28, 2018; 2019-007059, filed on Jan. 18, 2019; 2019-077905, filed on Apr. 16, 2019; and 2019-172731, filed on Sep. 24, 2019, the disclosures of which are incorporated herein by reference in their entireties.

BACKGROUND

Technical Field

The present invention relates to an electrode catalyst layer, a membrane electrode assembly, and a polymer electrolyte fuel cell.

Background Art

Fuel cells generate an electric current from the chemical reaction between hydrogen and oxygen. Fuel cells have attracted attention as a clean energy source that has higher efficiency and lower environmental load, and is quieter than conventional power generation systems. In particular, polymer electrolyte fuel cells, which can be used at around room temperature, are considered promising for application to, for example, in-vehicle power sources and domestic stationary power sources.

Polymer electrolyte fuel cells (PEFCs) include a polymer electrolyte membrane sandwiched between a fuel electrode (anode) and an air electrode (cathode). The anode and the cathode each include a laminate of an electrode catalyst layer and a gas diffusion layer. Polymer electrolyte fuel cells generate power by electrochemical reactions described below when a fuel gas containing hydrogen is supplied to the fuel electrode, and an oxidant gas containing oxygen is supplied to the air electrode. Note that, of the reaction formulae described below, Formula (1) indicates a reaction at the fuel electrode, and Formula (2) indicates a reaction at the air electrode.

$H_2 \rightarrow 2H^+ + 2e^-$  Formula (1)

$\tfrac{1}{2}O_2 + 2H^+ + 2e^- \rightarrow H_2O$  Formula (2)

An anode-side electrode catalyst layer promotes a reaction that generates protons and electrons from the fuel gas supplied to the anode-side electrode catalyst layer (Formula (1)). The protons pass through a polymer electrolyte in the anode-side electrode catalyst layer and a polymer electrolyte membrane and migrate to the cathode. The electrons pass through an external circuit and migrate to the cathode. In the cathode-side electrode catalyst layer, the protons, the electrons, and the oxidant gas react to generate water (Formula (2)).

To enhance the power generation performance of the polymer electrolyte fuel cell, improving the diffusivity of gas such as the fuel gas and the oxidant gas is important. As a technique for improving the gas diffusivity, a technique of forming an electrode catalyst layer using two kinds of carbon particles having a different average particle diameter from each other (for example, refer to PTL 1) and a technique of using fibrous carbon as a carrier that supports a catalyst (for example, PTL 2) have been proposed.

[Citation List] [Patent Literature] [PTL 1] JP 3617237 B; [PTL 2] JP 4037814 B.

SUMMARY OF THE INVENTION

Technical Problem

In order to reduce the cost required for fuel cells, fuel cells that can be operated at high output are required. However, the operation of a fuel cell at high output generates a large amount of water in the electrode catalyst layer of the air electrode. Thus, flooding occurs, which is a phenomenon in which the generated water overflows in the electrode catalyst layer and the gas diffusion layer of the air electrode, thereby hindering the supply of gas to the electrode catalyst layer of the air electrode. As a result, the power generation performance of the polymer electrolyte fuel cell is reduced.

An object of the present invention is to provide an electrode catalyst layer, a membrane electrode assembly, and a polymer electrolyte fuel cell that inhibit flooding in the electrode catalyst layer, so that power generation performance is improved.

Solution to Problem

To solve the above problem, an electrode catalyst layer is configured to be bonded to a polymer electrolyte membrane in a polymer electrolyte fuel cell. The electrode catalyst layer includes a catalyst material, a conductive carrier, which supports the catalyst material, a polymer electrolyte, and a fibrous material. The electrode catalyst layer includes a three-dimensional network of a flow path. The flow path includes a plurality of terminal points and a plurality of branches. Each of the branches is an elongated hole connecting a pair of the terminal points. The branches include a bifurcated branch. One of the pair of the terminal points of the bifurcated branch is connected to another of the branches. The number of branches per unit volume of the electrode catalyst layer is 8500 or more and 13000 or less. The unit volume is defined as 3.9 μm×3.9 μm×4.4 μm.

To solve the above problems, a membrane electrode assembly includes a polymer electrolyte membrane and the electrode catalyst layer. The electrode catalyst layer is bonded to the polymer electrolyte membrane.

To solve the above problems, a polymer electrolyte fuel cell includes the membrane electrode assembly.

According to each of the above configurations, the number of reaction points included in the electrode catalyst layer is increased compared with a case in which the number of branches per unit volume of the electrode catalyst layer is less than 8500. This prevents hindering of the increase in the output of the polymer electrolyte fuel cell due to an insufficient number of reaction points. This also prevents hindering of the gas diffusion and the water discharge in the electrode layer compared with a case in which the number of branches per unit volume of the electrode catalyst layer is greater than 13000. As a result, flooding in the electrode catalyst layer is inhibited, so that the power generation performance is improved.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

An electrode catalyst layer, a membrane electrode assembly, and a polymer electrolyte fuel cell according to an embodiment will be described with reference to FIGS. 1 to 7. A configuration of the membrane electrode assembly, a configuration of the electrode catalyst layer, the tortuosity of flow paths, a configuration of a single cell that forms the polymer electrolyte fuel cell, material for forming the electrode catalyst layer, a method of manufacturing the electrode catalyst layer and the membrane electrode assembly, and Test Examples will be described below in order.

Configuration of Membrane Electrode Assembly

Figure 1:
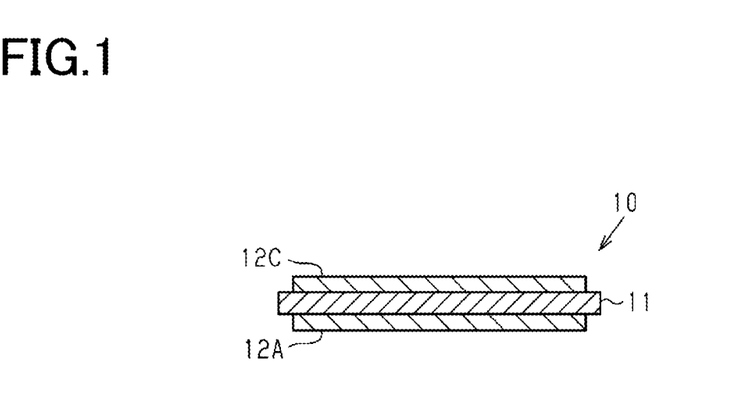
FIG. 1 is a cross-sectional view illustrating a structure of a membrane electrode assembly according to an embodiment.

The configuration of the membrane electrode assembly will be described with reference to FIG. 1. FIG. 1 shows a cross-sectional structure in a thickness direction of the membrane electrode assembly.

As shown in FIG. 1, a membrane electrode assembly 10 includes a polymer electrolyte membrane 11, a cathode-side electrode catalyst layer 12C, and an anode-side electrode catalyst layer 12A. The polymer electrolyte membrane 11 is a solid polymer electrolyte membrane. The polymer electrolyte membrane 11 has a pair of surfaces facing away from each other. One of the surfaces is bonded to the cathode-side electrode catalyst layer 12C, and the other one of the surfaces is bonded to the anode-side electrode catalyst layer 12A. The cathode-side electrode catalyst layer 12C is an electrode catalyst layer that constitutes an air electrode (cathode), and the anode-side electrode catalyst layer 12A is an electrode catalyst layer that constitutes a fuel electrode (anode). The outer peripheral portion of the cathode-side electrode catalyst layer 12C and the outer peripheral portion of the anode-side electrode catalyst layer 12A may be sealed with gaskets.

Configuration of Electrode Catalyst Layer

The configuration of the electrode catalyst layer will be described in more detail with reference to FIG. 2. An electrode catalyst layer described below is applied to the cathode-side electrode catalyst layer 12C and the anode-side electrode catalyst layer 12A. Note that the electrode catalyst layer described below may be applied only to either one of the cathode-side electrode catalyst layer 12C or the anode-side electrode catalyst layer 12A.

Figure 2:
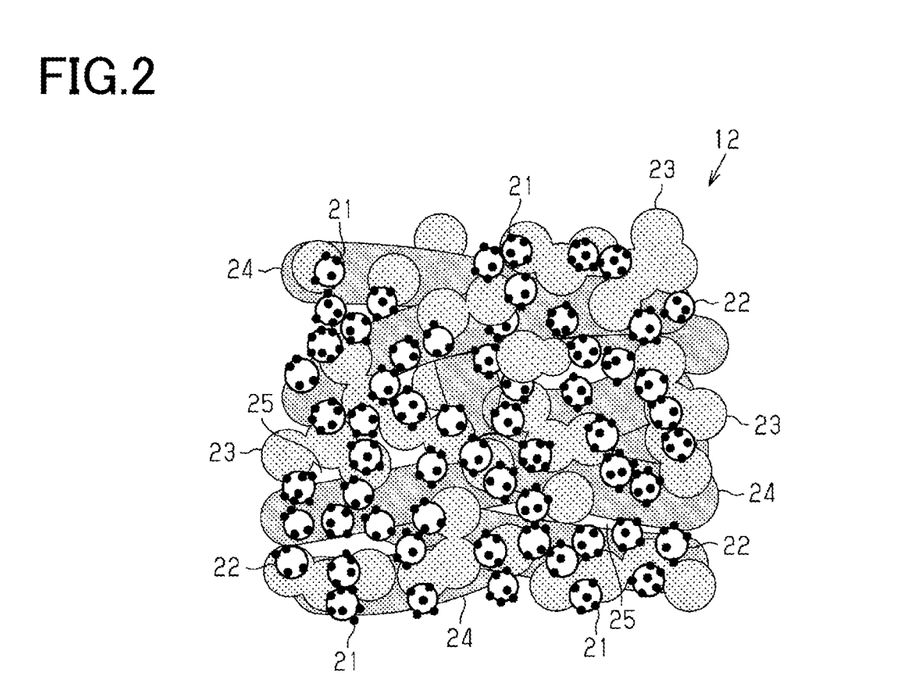
FIG. 2 is a schematic diagram illustrating a structure of an electrode catalyst layer provided in the membrane electrode assembly illustrated in FIG. 1.

As shown in FIG. 2, the electrode catalyst layer 12 includes a catalyst material 21, a conductive carrier 22, a polymer electrolyte 23, and a fibrous material 24. The catalyst material 21 is supported on the conductive carrier 22. A catalyst carrier is formed of the conductive carrier 22 and the catalyst material 21 supported on the conductivity carrier. Pores 25 correspond to portions of the electrode catalyst layer 12 in which the catalyst material 21, the conductive carrier 22, the polymer electrolyte 23, and the fibrous material 24 are not present. The number, distribution, and size of the pores 25 in the electrode catalyst layer 12 change depending on the kind, size, formulation ratio, preparation method, and application method of each material included in the electrode catalyst layer 12. The pores 25 in the electrode catalyst layer 12 function as flow paths for gas supplied to the electrode catalyst layer 12 and flow paths for water generated in the electrode catalyst layer 12.

Figure 3:
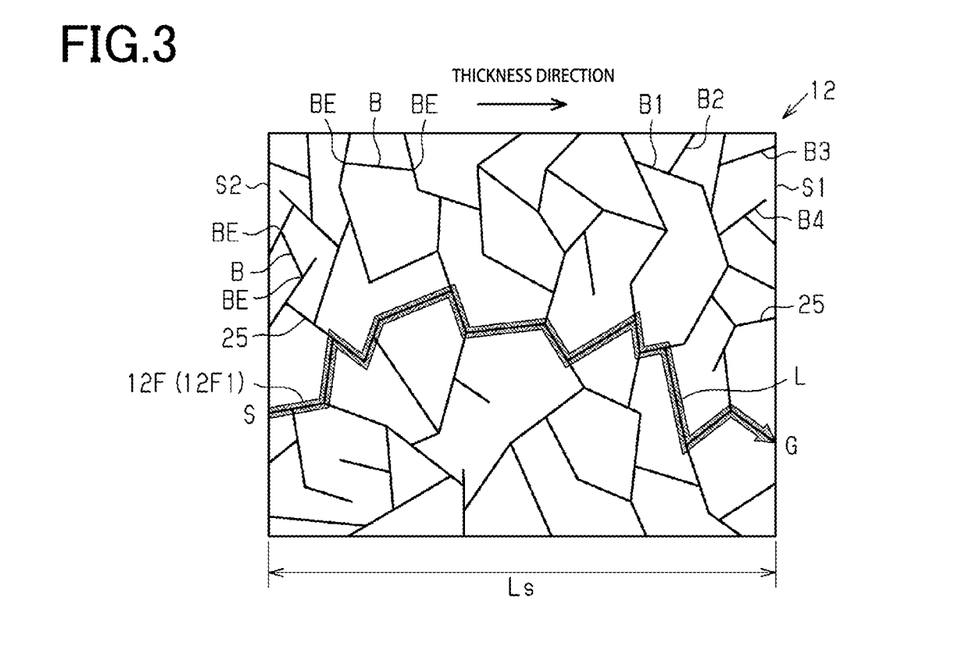
FIG. 3 is a schematic diagram illustrating flow paths included in the electrode catalyst layer illustrated in FIG. 2.

FIG. 3 schematically illustrates the flow paths included in the electrode catalyst layer 12.

As shown in FIG. 3, the electrode catalyst layer 12 includes a pair of surfaces located on opposite sides of the electrode catalyst layer 12 to each other in the thickness direction. A surface of the electrode catalyst layer 12 in contact with the polymer electrolyte membrane 11 is a first surface S1 and a surface facing away from the first surface S1 is a second surface S2. As described above, the electrode catalyst layer 12 includes the pores 25, which correspond to portions in which the catalyst material 21, the conductive carrier 22, the polymer electrolyte 23, and the fibrous material 24 are not present.

The electrode catalyst layer 12 includes a three-dimensional network of flow paths 12F. The flow paths 12F are formed of a plurality of branches B. In the flow paths 12F, an elongated hole connecting a pair of (that is, two) terminal points BE corresponds to one of the branches B. The flow paths 12F are a group of the branches B. The branches B have various line shapes such as a straight line, a bent line, a curved line, and a circular line. Among the pores 25 of the electrode catalyst layer 12, pores 25 that have a particulate shape such as a spherical shape, an oval spherical shape, and a polyhedron shape are not included in the branches B.

The plurality of branches B include a bifurcated branch. One of the terminal points BE of a branch B is a bifurcation point of another branch B. That is, one of a pair of terminal points of the bifurcated branch is connected to another branch. The plurality of branches B may include a closed branch, in which one of the two terminal points BE is a closed point that is not connected to another branch B. The plurality of branches B may include a branchlet, in which at least one of the two terminal points BE is located on the surface that defines a unit volume of the electrode catalyst layer 12. Since the electrode catalyst layer 12 is allowed to include the closed branch and the branchlet, the three-dimensional network of the flow paths 12F is easily formed in the electrode catalyst layer 12. In FIG. 3, a branch B1 is an example of the bifurcated branch, a branch B2 and a branch B3 are examples of the branchlet, and a branch B4 is an example of the closed branch.

The flow paths 12F include through passages 12F1, which extend from the second surface S2 to the first surface S1. Each of the through passages 12F1 includes an opening on the second surface S2 and another opening on the first surface S1. For example, the opening on the second surface S2 is a starting point S of each through passage 12F1, and the opening on the first surface S1 is an endpoint G of the through passage 12F1. The plurality of through passages 12F1, which have openings on the second surface S2, may include the through passage 12F1 that intersects with one or more other flow paths 12F before reaching the first surface S1. Such a through passage 12F1 includes three or more openings. The plurality of through passages 12F1 may include the through passage 12F1, which has an opening on the second surface S2 and an opening on the first surface S1. That is, the number of openings to which each of the through passages 12F1 is connected is two or more.

The through passage 12F1 that branches on the way from the second surface S2 to the first surface S1 is treated as the plurality of branches B the number of which corresponds to the number of bifurcations. For example, if the number of bifurcations of one through passage 12F1 is one, the through passage 12F1 is treated as two branches B. If the number of bifurcations from one through passage 12F1 is n (n is an integer greater than or equal to 1), the through passage 12F1 is treated as the branches B the number of which is n+1. FIG. 3 illustrates an example of the through passage 12F1 included in the electrode catalyst layer 12 with an arrow. The distance from one opening to the other opening of one through passage 12F1 is the entire length L of the through passage 12F1. The flow paths 12F may include a closed passage that is open on the second surface S2 but is not open on the first surface S1, or may include a closed passage that is open on the first surface S1 but is not open on the second surface S2.

The electrode catalyst layer 12 satisfies Condition 1 given below.

(Condition 1) The number of branches B included in a unit volume, which is defined as 3.9 μm×3.9 μm×4.4 μm, is 8500 or more and 13000 or less.

The electrode catalyst layer 12, which satisfies Condition 1, increases the number of reaction points included in the electrode catalyst layer 12 compared with a case in which the number of branches B per unit volume of the electrode catalyst layer 12 is less than 8500. This prevents hindering of the increase in the output of the polymer electrolyte fuel cell due to an insufficient number of reaction points. This also prevents hindering of the gas diffusion and the water discharge in the electrode catalyst layer 12 compared with a case in which the number of branches B per unit volume of the electrode catalyst layer 12 is greater than 13000. As a result, flooding in the electrode catalyst layer 12 is inhibited, so that power generation performance is improved. The unit volume is preferably defined from a region that does not include the surface of the electrode catalyst layer 12.

The electrode catalyst layer 12 may have a monolayer structure or a multilayer structure. The electrode catalyst layer 12 having the multilayer structure preferably includes layers the number of which is less than or equal to four to inhibit the decrease in the power generation performance due to the interface resistance between the electrode catalyst layers 12. The thickness of each layer may all be the same, or the thickness of each layer may differ from each other. In the electrode catalyst layer 12 having the multilayer structure, the catalyst material 21, the conductive carrier 22, the polymer electrolyte 23, and the fibrous material 24 in each layer may be the same as each other or may differ from each other. In the electrode catalyst layer 12 having the multilayer structure, the interface between the layers may be flat or may include a curved surface.

The average value of the thickness of one electrode catalyst layer 12 is preferably 5.0 μm or more and 100 μm or less, and more preferably 5.0 μm or more and 50 μm or less, and further preferably 1 μm or more and 20 μm or less.

Tortuosity of Flow Paths

The three-dimensional structure of the electrode catalyst layer 12 can be analyzed using a three-dimensional measurement scanning electron microscope (3D-SEM). The entire length L of the through passage 12F1 in the electrode catalyst layer 12 can be calculated by extracting the pores 25 from the three-dimensional structure.

In calculating the tortuosity, first, the electrode catalyst layer 12 is scanned using the 3D-SEM to obtain voxel data of the electrode catalyst layer 12, which is a three-dimensional image of the electrode catalyst layer 12. The voxel data of the electrode catalyst layer 12 includes the voxel data of the pores 25 included in the electrode catalyst layer 12. Next, the voxel data of the pores 25 is sliced on a voxel-by-voxel basis sequentially from the data constituting the outer surface of the pores 25 with the pores maintaining a closed-ring shape repeatedly until a one-dimensional skeleton is obtained. From the thus obtained one-dimensional skeleton, the entire length L of the through passage 12F1 formed by the connection of the branches B is calculated.

If the distance between the gas diffusion layer and the polymer electrolyte membrane 11 of the polymer electrolyte fuel cell, that is, the thickness of the electrode catalyst layer 12 is Ls, a value obtained by dividing the entire length L of the through passage 12F1 by the thickness Ls of the electrode catalyst layer 12 is the tortuosity (L/Ls). In calculating the tortuosity, the flow paths 12F that do not connect the first surface S1 to the second surface S2 are excluded.

The tortuosity is a value obtained by normalizing the entire length L of each of the through passages 12F1 by the thickness Ls of the electrode catalyst layer 12. Thus, the greater the entire length L of the each of the through passages 12F1 than the thickness Ls of the electrode catalyst layer 12, the greater the difference between the value of the tortuosity and 1. In the meantime, the smaller the difference between the entire length L of the through passage 12F1 and the thickness Ls of the electrode catalyst layer 12, the closer the tortuosity is to 1.

That is, the closer the tortuosity is to 1, the more likely the through passages 12F1 become substantially straight, and the greater the difference between the tortuosity and 1, the more complex the curved shape of the through passages 12F1 becomes. For this reason, as the tortuosity becomes closer to 1, the gas diffusivity and the water discharge performance of the through passages 12F1 having that tortuosity are improved, and thus the gas diffusivity and the water discharge performance of the flow paths 12F are improved compared with a case in which the tortuosity is sufficiently greater than 1. In contrast, as the difference between the tortuosity and 1 is increased, the gas diffusivity and the water discharge performance of the through passages 12F1 having that tortuosity and the gas diffusivity and the water discharge performance of the flow paths 12F deteriorate compared with a case in which the tortuosity is close to 1. As described above, the tortuosity is an index of the gas diffusivity and the water discharge performance of each of the flow paths 12F.

The tortuosity is also an index indicating the number of reaction points of each of the through passages 12F1. As described above, since the curved shape of the flow paths 12F becomes more complex as the difference between the tortuosity and 1 is increased, the number of reaction points where the electrochemical reaction occurs is increased. In contrast, since the through passages 12F1 are likely to become substantially straight as the tortuosity becomes closer to 1, the number of reaction points is decreased. As described above, if the tortuosity is greater than or equal to 1, the gas diffusivity and the water discharge performance have a trade-off relationship with the reaction points. The trade-off relationship refers to a situation where one is increased the other is decreased.

Figure 4:
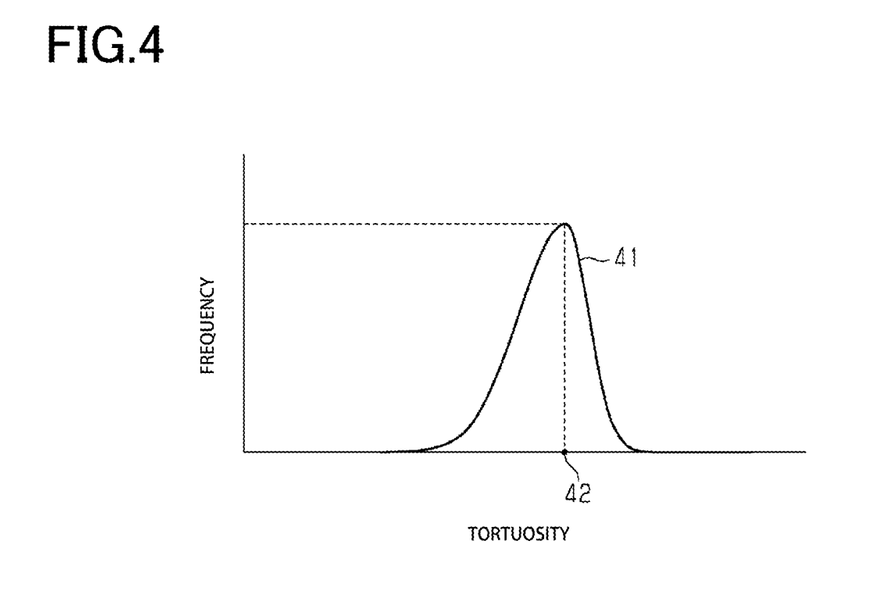
FIG. 4 is a graph showing an example of a histogram of tortuosity.

FIG. 4 shows an example of a histogram of the tortuosity.

As shown in FIG. 4, the histogram 41 has a mode value 42. The mode value 42 is a value that most frequently occurs in the tortuosity.

In FIG. 4, since the class width set for the histogram 41 is significantly small with respect to the width of the histogram 41, an approximate curve that connects a plurality of points indicating the frequency in each class is shown as the histogram. The histogram 41 may be unimodal or multimodal. A unimodal histogram indicates that the histogram has only one maximum value. A multimodal histogram indicates that the histogram 41 has a plurality of maximum values. The histogram 41 of the tortuosity may be a normal distribution curve or a non-normal distribution curve. The histogram 41 is not limited to the curved line shown in FIG. 4, but may be a scatter plot or a column diagram.

The tortuosity of the electrode catalyst layer 12 satisfies Condition 2 given below.

(Condition 2) In a histogram 41 of the tortuosity with a class width of 0.01, the mode value 42 is 1.8 or more and 2.8 or less.

According to the electrode catalyst layer 12, which satisfies Condition 2, the mode value 42 in the histogram of the tortuosity is 1.8 or more. Thus, the number of reaction points is prevented from being decreased to a degree that hinders the increase in the output of the polymer electrolyte fuel cell at the initial stage when the polymer electrolyte fuel cell is operated. Additionally, since the mode value 42 is 2.8 or less, the gas diffusion and the water discharge in the electrode catalyst layer 12 are prevented from being hindered due to excessively long length of the through passages 12F1 included in the electrode catalyst layer 12 at the initial stage when a polymer electrolyte fuel cell 30 is operated. Note that, it is difficult to produce the electrode catalyst layer 12 having a tortuosity exceeding 2.8.

Figure 5:
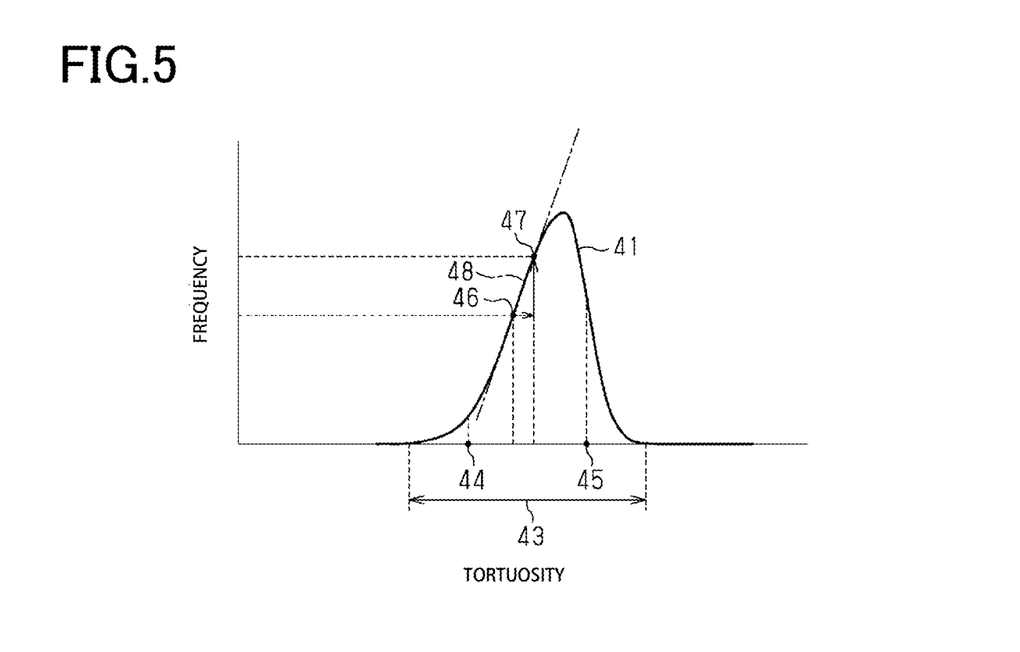
FIG. 5 is a graph showing an example of a histogram of tortuosity.

FIG. 5 shows the same example of the histogram as in FIG. 4.

As shown in FIG. 5, the histogram 41 includes a width 43, a first quartile 44, and a third quartile 45. The width 43 is a value obtained by subtracting the minimum value of the tortuosity from the maximum value of the tortuosity. The first quartile 44 is a value at 25% (25 percentile) when the tortuosity is arranged in ascending order. The third quartile 45 is a value at 75% (75 percentile) when the tortuosity is arranged in ascending order.

The histogram 41 includes a first point 46, a second point 47, and an inclination 48. The inclination 48 is a change rate of a straight line that passes through the first point 46 and the second point 47. The inclination 48 of the histogram 41 changes continuously. The absolute value of the inclination 48 of the histogram 41 generally has the maximum value at the inflection point of the histogram. In the actual measured value, however, the maximum value of the absolute value of the inclination 48 does not necessarily match with the inflection point.

The tortuosity of the electrode catalyst layer 12 satisfies at least one of Conditions 3 to 7 listed below.

(Condition 3) The width 43 of the tortuosity, which is a value obtained by subtracting the minimum value of the tortuosity from the maximum value of the tortuosity, is 1.14 or more and 1.50 or less.

(Condition 4) The full width at half maximum of the tortuosity is 0.30 or more and 0.40 or less.

(Condition 5) The standard deviation of the tortuosity is 0.15 or more and 0.20 or less.

(Condition 6) The quartile deviation of the tortuosity is 0.10 or more and 0.15 or less.

(Condition 7) The maximum inclination is 4200 or more and 10000 or less.

The electrode catalyst layer 12, which satisfies Condition 3 or Condition 4, can include both the through passages 12F1 that have relatively high water discharge performance and the through passages 12F1 that have a relatively great number of reaction points in the flow paths 12F. This inhibits flooding in the electrode catalyst layer 12, so that the power generation performance of the polymer electrolyte fuel cell including the electrode catalyst layers 12 is improved.

If the tortuosity satisfies Condition 5, the tortuosity has a variance in the range corresponding to 15% or more and 21% or less of the thickness Ls of the electrode catalyst layer 12. That is, the lengths of all the through passages 12F1 of the electrode catalyst layer 12 have a significant variance. Thus, the electrode catalyst layer 12 includes the through passages 12F1 that are relatively short and have high gas diffusivity and high water discharge performance and the through passages 12F1 that are relatively long and have many reaction points. As a result, the water discharge performance and the power generation performance of the polymer electrolyte fuel cell including the electrode catalyst layers 12 are improved.

If the tortuosity satisfies Condition 6, the tortuosity has variance between the first quartile 44 and the third quartile 45, which sandwich the median value of the tortuosity. This inhibits the tortuosity of the plurality of through passages 12F1 from concentrating around the median value. That is, the plurality of through passages 12F1 of the electrode catalyst layer 12 include the through passages 12F1 that are relatively short and have high gas diffusivity and high water discharge performance and the through passages 12F1 that are relatively long and have many reaction points. As a result, the water discharge performance and the power generation performance of the polymer electrolyte fuel cell including the electrode catalyst layers 12 are further improved.

The maximum inclination in Condition 7 is set as follows. That is, in the histogram 41 of the tortuosity with the class width set to 0.01, the histogram 41 includes the first point 46, and the second point 47 which is different from the first point 46. The first point 46 is a point determined by a first tortuosity corresponding to the first class and a first frequency of the first class. The second point 47 is a point determined by a second tortuosity corresponding to the second class, which is different from the first class, and a second frequency of the second class.

The difference between the tortuosity at the first point 46 and the tortuosity at the second point 47 is 0.05. The change rate of a value obtained by subtracting the frequency at the second point 47 from the frequency at the first point 46 with respect to the difference of the tortuosity is the inclination 48 of the straight line that passes through the first point 46 and the second point 47. In the histogram 41, the maximum value among the absolute values of the inclinations 48, each of the inclinations is calculated per class, is the maximum inclination. That is, in the histogram 41, the inclination 48 is calculated every time the value of the tortuosity changes by 0.01, and the maximum value among the absolute values of the inclinations 48, which have been calculated, is the maximum inclination.

Since the maximum inclination is 4200 or more, the change rate of the frequency in the tortuosity is prevented from being excessively decreased. Thus, compared with a case in which the maximum inclination is less than 4200, the histogram 41 has a rapidly rising section. Consequently, compared with a case in which the maximum inclination is less than 4200, the electrode catalyst layer 12 is prevented from including the through passages 12F1 having different tortuosities uniformly.

Since the maximum inclination is 10000 or less, the change rate of the frequency in the tortuosity is prevented from being excessively increased. Thus, compared with a case in which the maximum inclination exceeds 10000, the histogram 41 has a more gently-sloping section. Consequently, compared with a case in which the maximum inclination exceeds 10000, the electrode catalyst layer 12 is prevented from including only the through passages 12F1 having a specific tortuosity.

As described above, if the maximum inclination is 4200 or more and 10000 or less, the electrode catalyst layer 12 is prevented from including only the through passages 12F1 included in a specific range of the tortuosity while allowing variance in the distribution of the tortuosity of the plurality of through passages 12F1 included in the electrode catalyst layer 12. Thus, the through passages 12F1 that are relatively short and have high gas diffusivity and high water discharge performance and the through passages 12F1 that are relatively long and have many reaction points are easily included in the electrode catalyst layer 12.

Configuration of Polymer Electrolyte Fuel Cell

Figure 6:
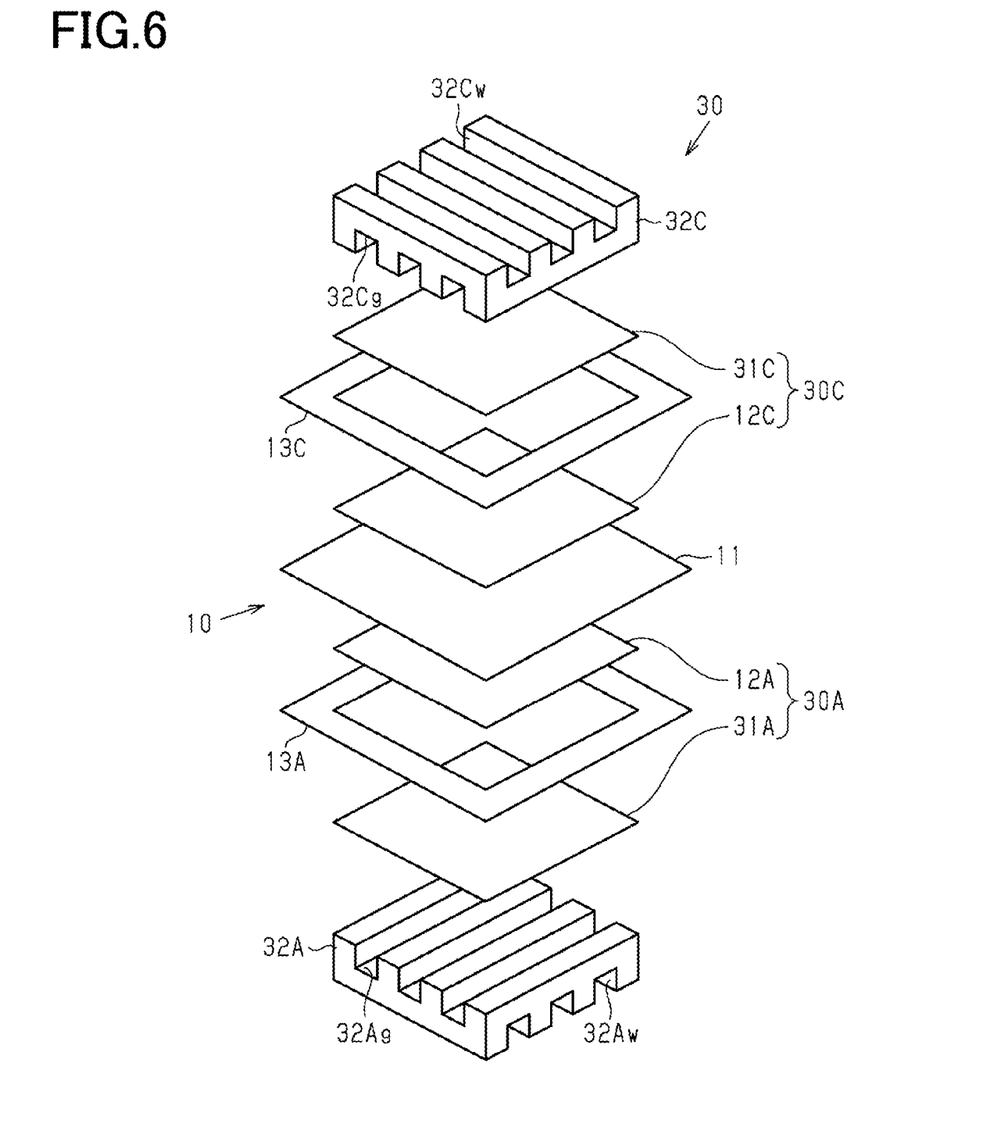
FIG. 6 is an exploded perspective view illustrating a structure of a polymer electrolyte fuel cell including the membrane electrode assembly illustrated in FIG. 1.

The configuration of the polymer electrolyte fuel cell including the membrane electrode assembly will be described with reference to FIG. 6. The configuration described below is an example of the configuration of the polymer electrolyte fuel cell. FIG. 6 shows the configuration of a single cell of the polymer electrolyte fuel cell. The polymer electrolyte fuel cell may include a plurality of single cells, and the plurality of single cells may be stacked on each other.

As shown in FIG. 6, the polymer electrolyte fuel cell 30 includes the membrane electrode assembly 10, a pair of gas diffusion layers, and a pair of separators. The pair of gas diffusion layers are a cathode-side gas diffusion layer 31C and an anode-side gas diffusion layer 31A. The pair of separators are a cathode-side separator 32C and an anode-side separator 32A.

The cathode-side gas diffusion layer 31C is in contact with the cathode-side electrode catalyst layer 12C. The cathode-side electrode catalyst layer 12C and the cathode-side gas diffusion layer 31C constitute an air electrode (cathode) 30C. The anode-side gas diffusion layer 31A is in contact with the anode-side electrode catalyst layer 12A. The anode-side electrode catalyst layer 12A and the anode-side gas diffusion layer 31A constitute a fuel electrode (anode) 30A.

The surface of the polymer electrolyte membrane 11 to which the cathode-side electrode catalyst layer 12C is bonded is a cathode surface, and the surface to which the anode-side electrode catalyst layer 12A is bonded is an anode surface. A portion of the cathode surface that is not covered with the cathode-side electrode catalyst layer 12C is an outer peripheral portion. At the outer peripheral portion, a cathode-side gasket 13C is located. A portion of the anode surface that is not covered with the anode-side electrode catalyst layer 12A is an outer peripheral portion. At the outer peripheral portion, an anode-side gasket 13A is located. The cathode-side gasket 13C and the anode-side gasket 13A prevent leakage of gas from the outer peripheral portions of each surface.

In a thickness direction of the polymer electrolyte fuel cell 30, the cathode-side separator 32C and the anode-side separator 32A sandwich a multilayer formed of the membrane electrode assembly 10 and the two gas diffusion layers 31C and 31A. The cathode-side separator 32C faces the cathode-side gas diffusion layer 31C. The anode-side separator 32A faces the anode-side gas diffusion layer 31A.

A pair of surfaces of the cathode-side separator 32C facing away from each other each have a plurality of grooves. The grooves in one of the pair of surfaces that faces the cathode-side gas diffusion layer 31C form gas flow paths 32Cg. The grooves in the other surface facing away from the cathode-side gas diffusion layer 31C form cooling water flow paths 32Cw. A pair of surfaces of the anode-side separator 32A facing away from each other each have a plurality of grooves. The grooves in one of the pair of surfaces that faces the anode-side gas diffusion layer 31A form gas flow paths 32Ag. The grooves in the other surface facing away from the anode-side gas diffusion layer 31A form cooling water flow paths 32Aw. The separators 32C and 32A are formed of a material that is conductive and has a low permeability to gas.

In the polymer electrolyte fuel cell 30, an oxidant gas is supplied through the gas flow paths 32Cg in the cathode-side separator 32C to the air electrode 30C. A fuel gas is supplied through the gas flow paths 32Ag in the anode-side separator 32A to the fuel electrode 30A. This causes the polymer electrolyte fuel cell 30 to generate power. Examples of the oxidant gas include air and oxygen gas. The fuel gas may be, for example, hydrogen gas.

Material for Forming Electrode Catalyst Layer

The material for forming the electrode catalyst layer 12 will be described in further detail below.

The catalyst material 21 may be formed of a platinum group metal or a metal other than the platinum group metal. Examples of platinum group metals include platinum, palladium, ruthenium, iridium, rhodium, and osmium. Examples of metals other than the platinum group metals include iron, lead, copper, chromium, cobalt, nickel, manganese, vanadium, molybdenum, gallium, and aluminum. The catalyst material 21 may be formed of an alloy, an oxide, a multiple oxide, or the like of these metals. The catalyst material 21 is preferably formed of platinum or a platinum alloy.

The catalyst material 21 is in a particulate form. The particle size of the catalyst material 21 is preferably 0.5 nm or more and 20 nm or less, and more preferably 1 nm or more and 5 nm or less. The catalyst material 21 with a particle size of 0.5 nm or more has improved stability. The catalyst material 21 with a particle size of 20 nm or less inhibits the decrease in the activity of the catalyst material 21.

The conductive carrier 22 may be, for example, carbon particles. The carbon particles may be any carbon material as long as they are conductive fine particles and are not eroded by the catalyst material 21. The carbon particles may be, for example, carbon blacks, graphite, black lead, activated carbon, and fullerenes. Examples of the carbon blacks include acetylene black, furnace black, and Ketjenblack.

The carbon particles preferably have a particle size of 10 nm or more and 1000 nm or less, and more preferably 10 nm or more and 100 nm or less. The carbon particles with a particle size of 10 nm or more allow an electron conductive path to be easily formed. The carbon particles with a particle size of 1000 nm or less prevent the increase in the resistance of the electrode catalyst layer 12 due to an increased thickness of the electrode catalyst layer 12 and thus prevent the decrease in the power generation performance. The use of the carbon particles with a large surface area as the conductive carrier 22 allows the conductive carrier 22 to support the catalyst material 21 with a high density, which improves the catalyst activity of the catalyst carrier. The conductive carrier 22 may be a carrier other than the carbon particles.

The polymer electrolyte 23 may be a proton conductive polymer electrolyte. In order to improve adhesion between the electrode catalyst layer 12 and the polymer electrolyte membrane 11, the polymer electrolyte 23 is preferably the same electrolyte as or a similar electrolyte to that of the polymer electrolyte membrane 11. The polymer electrolyte 23 may be formed of, for example, a fluororesin or a hydrocarbon resin. The fluororesin may be, for example, Nafion (registered trademark, manufactured by DuPont). Examples of hydrocarbon resins include sulfonated polyether ketones, sulfonated polyether sulfones, sulfonated polyether ether sulfones, sulfonated polysulfides, and sulfonated polyphenylenes.

The average thickness of one polymer electrolyte membrane 11 is preferably 1 μm or more and 500 μm or less, more preferably 3 μm or more and 200 μm or less, and further preferably 5 μm or more and 100 μm or less.

Examples of the fibrous material 24 include electron conductive fibers and proton conductive fibers. Examples of the electron conductive fibers include carbon fibers, carbon nanotubes, carbon nanohorns, and conductive polymer nanofibers. In terms of conductivity and dispersibility, carbon nanofibers or carbon nanotubes are preferably used as the fibrous material 24.

The proton conductive fibers may be any fiber as long as the fiber is obtained by processing the polymer electrolyte having proton conductivity into a fibrous form. The proton conductive fibers may be formed of, for example, a fluorine polymer electrolyte or a hydrocarbon polymer electrolyte. Examples of the fluorine polymer electrolyte include Nafion (registered trademark) manufactured by DuPont, Flemion (registered trademark) manufactured by Asahi Glass Co., Ltd, Aciplex (registered trademark) manufactured by Asahi Kasei Corporation, and Gore-Select (registered trademark) manufactured by Gore. Examples of the hydrocarbon polymer electrolyte include electrolytes such as sulfonated polyether ketones, sulfonated polyether sulfones, sulfonated polyether ether sulfones, sulfonated polysulfides, and sulfonated polyphenylenes.

The fibrous material 24 may be formed of only one type of the above fibers or two or more types of the above fibers. The fibrous material 24 may be formed of both the electron conductive fibers and the proton conductive fibers.

The thickness of the fibrous material 24 is preferably 0.5 nm or more and 500 nm or less, more preferably 5 nm or more and 400 nm or less, and further preferably 10 nm or more and 300 nm or less. The fibrous material 24 with a thickness of 0.5 nm or more and 500 nm or less increases the number of branches B in the electrode catalyst layer 12 and thus improves the output of the polymer electrolyte fuel cell 30.

The length of the fibrous material 24 is preferably 0.1 μm or more and 200 μm or less, more preferably 0.5 μm or more and 100 μm or less, and further preferably 1 μm or more and 50 μm or less. The fibrous material 24 with a length of 0.1 μm or more and 200 μm or less increases the strength of the electrode catalyst layer 12, which inhibits generation of cracks during formation of the electrode catalyst layer 12.

Since the electrode catalyst layer 12 includes the fibrous material 24, the branches B easily occur in the electrode catalyst layer 12, and the length of the through passages 12F1 formed in the electrode catalyst layer 12 is increased compared with a case in which the electrode catalyst layer 12 does not include the fibrous material 24. More specifically, the tortuosity of the through passages 12F1 is likely to be greater than or equal to 1. Thus, compared with a case in which the tortuosity of the through passages 12F1 is less than 1, the water discharge performance and the gas diffusivity of the electrode catalyst layer 12 are improved, and the number of reaction points is increased.

When the polymer electrolyte fuel cell 30 is operated under low-humidity conditions, the power generation performance of the polymer electrolyte fuel cell 30 is likely to be decreased due to dryout, which is drying of the anode-side electrode catalyst layer 12A. Accordingly, water in the gas to be supplied to the cathode-side electrode catalyst layer 12C may be increased to operate the polymer electrolyte fuel cell 30 under high-humidity conditions, so that the power generation performance of the polymer electrolyte fuel cell 30 is improved. Unfortunately, since flooding is induced in the electrode catalyst layer 12 if the polymer electrolyte fuel cell 30 is operated under high-humidity conditions, it is necessary to improve the water discharge performance of the electrode catalyst layer 12. In this regard, since the electrode catalyst layer 12 includes the fibrous material 24, as described above, the electrode catalyst layer 12 can have the flow paths 12F, which are long, include many branches B, and extend through the electrode catalyst layer 12, or in other words, have a tortuosity of 1 or more. This improves the water discharge performance of the electrode catalyst layer 12, resulting in preventing the decrease in the power generation performance of the polymer electrolyte fuel cell 30 due to flooding.

Even if the electrode catalyst layer 12 does not include the fibrous material 24, the branches B included in the electrode catalyst layer 12 can be increased by a method such as decreasing the ratio of the polymer electrolyte 23 to the electrode catalyst layer 12. Note that, the fibrous material 24 is preferably included in terms of inhibiting cracks from occurring in the electrode catalyst layer 12.

Method of Producing Membrane Electrode Assembly

In producing the membrane electrode assembly 10, the electrode catalyst layer 12 is formed on a transfer substrate, and the electrode catalyst layer 12 is bonded to the polymer electrolyte membrane 11 by thermocompression bonding. Alternatively, the electrode catalyst layer 12 may be formed on each of the gas diffusion layers 31A and 31C, and then the electrode catalyst layers 12 are bonded to the polymer electrolyte membrane 11 by thermocompression bonding. Alternatively, the electrode catalyst layers 12 may be directly formed on the polymer electrolyte membrane 11.

In producing the electrode catalyst layer 12, firstly, a catalyst layer slurry for forming the electrode catalyst layer 12 is prepared. Next, the catalyst layer slurry is applied to a substrate, and then the catalyst layer slurry is dried to form the electrode catalyst layer 12. The catalyst layer slurry contains the catalyst material 21, the conductive carrier 22, the polymer electrolyte 23, the fibrous material 24, and a solvent.

The solvent is preferably, for example, a liquid in which the polymer electrolyte 23 can be dispersed or a liquid in which the polymer electrolyte 23 can be dissolved. The solvent may be formed of water, alcohols, ketones, ethers, sulfoxides, amides, or the like. Examples of alcohols may include methanol, ethanol, 1-propanol, 2-propanol, 1-butanol, 2-butanol, 3-butanol, pentanol, ethylene glycol, diacetone alcohol, and 1-methoxy-2-propanol. Examples of ketones may include acetone, methyl ethyl ketone, pentanone, methyl isobutyl ketone, and diisobutyl ketone. Examples of ethers may include dioxane and tetrahydrofuran. Examples of sulfoxides may include dimethyl sulfoxide. Examples of amides may include dimethylformamide and dimethylacetamide. The above-mentioned solvents may be used individually or in combination as the solvent of the catalyst layer slurry.

The solvent of the catalyst slurry is preferably a solvent that is easily removed by heating. For this reason, the boiling point of the solvent is preferably 150° C. or less. The concentration of the solute in the catalyst layer slurry is preferably, for example, 1% by weight or more and 80% by weight or less, more preferably 5% by weight or more and 60% by weight or less, and further preferably 10% by weight or more and 40% by weight or less. The solute of the catalyst layer slurry contains the catalyst material 21, the conductive carrier 22, the polymer electrolyte 23, and the fibrous material 24.

In preparing the catalyst layer slurry, the catalyst material 21, the conductive carrier 22, the polymer electrolyte 23, and the fibrous material 24 are mixed in a solvent, and then the mixture is subjected to a dispersion process. In the dispersion process, for example, a ball mill, a bead mill, a roll mill, a shear mill, a wet mill, an ultrasonic disperser, or a homogenizer can be used.

The catalyst layer slurry can be applied by using, for example, a roll coater, an air knife coater, a blade coater, a rod coater, a reverse coater, a bar coater, a comma coater, a die coater, a gravure coater, a screen coater, a spray, or a spinner.

Examples of the method of drying the catalyst layer slurry may include warm air drying and IR drying. The drying temperature is preferably 40° C. or more and 200° C. or less, and more preferably 40° C. or more and 120° C. or less. The drying time is preferably 0.5 minutes or more and 1 hour or less, and more preferably 1 minute or more and 30 minutes or less. The method of drying the catalyst layer slurry may be one method or may be a plurality of methods. That is, in drying the catalyst layer slurry, only one of the warm air drying and the IR drying needs to be used, but both of the warm air drying and the IR drying may be used.

In a case in which the transfer substrate is used, the catalyst layer slurry is applied to the transfer substrate and then dried to prepare the substrate with the electrode catalyst layer. After that, for example, the surface of the electrode catalyst layer 12, which is on the substrate with the electrode catalyst layer, is brought into contact with the polymer electrolyte membrane 11. In this state, the electrode catalyst layer 12 and the polymer electrolyte membrane 11 are heated and pressurized to be bonded. The electrode catalyst layers 12 are bonded to both sides of the polymer electrolyte membrane 11 to produce the membrane electrode assembly 10.

The transfer substrate may be any substrate as long as the catalyst layer slurry can be applied to at least one side of the substrate, the catalyst layer slurry can be dried by heating, and the electrode catalyst layer 12 can be transferred to the polymer electrolyte membrane 11. Examples of the transfer substrate may include a polymer film and a fluororesin film that has heat resistance. Examples of the polymer forming the polymer film include, for example, polyethylene terephthalate, polyamide, polyimide, polystyrene, polysulfone, polyethersulfone, polyphenylene sulfide, polyether ether ketone, polyether imide, polybenzimidazole, polyamide imide, polyacrylate, polyethylene naphthalate, and polyparabanic acid aramid. Examples of resins for forming the fluororesin film may include, for example, polytetrafluoroethylene, polychlorotrifluoroethylene, polyvinylidene fluoride, ethylene-tetrafluoroethylene copolymer, tetrafluoroethylene-hexafluoropropylene copolymer, and tetrafluoroethylene-perfluoroalkyl vinyl ether copolymer.

The transfer substrate may be a substrate obtained by subjecting the surface of the polymer film or the fluororesin film, which are mentioned above, to mold release treatment or a substrate obtained by integrally molding each of the above-mentioned films and a mold release layer by, for example, coextrusion.

The transfer substrate may have a monolayer structure or a multilayer structure. In a case in which the transfer substrate has a multilayer structure, the top layer may have an opening. The opening is a section where part of the layer is removed by cutting or punching. Additionally, the electrode catalyst layer 12, which is formed by drying the catalyst layer slurry, may have a shape corresponding to the opening.

In a case in which the electrode catalyst layer 12 is directly formed on the polymer electrolyte membrane 11, for example, the catalyst slurry is applied on the surface of the polymer electrolyte membrane 11, and then the solvent is removed from the catalyst slurry to form the electrode catalyst layer 12. The method of forming the electrode catalyst layer 12 directly on the polymer electrolyte membrane 11 is preferable in terms of high adhesion between the polymer electrolyte membrane 11 and the electrode catalyst layer 12 and avoiding the occurrence of crushing of the electrode catalyst layer 12 due to thermocompression bonding to the polymer electrolyte membrane 11.

In a case in which the polymer electrolyte fuel cell 30 includes the gaskets 13A and 13C, the gaskets 13A and 13C are located on the sections of the polymer electrolyte membrane 11 not covered with the electrode catalyst layers 12. The gaskets 13A and 13C are required to satisfy the conditions of allowing an adhesive material to be applied or adhered to at least one side and to be able to adhere to the polymer electrolyte membrane 11. The gaskets 13A and 13C can be formed of the material used for forming the transfer substrate as described above. The average thickness of each of the gaskets 13A and 13C is preferably 1 µm or more and 500 µm or less, more preferably 3 µm or more and 200 µm or less, and further preferably 5 µm or more and 100 µm or less.

Test Examples

Figure 7:
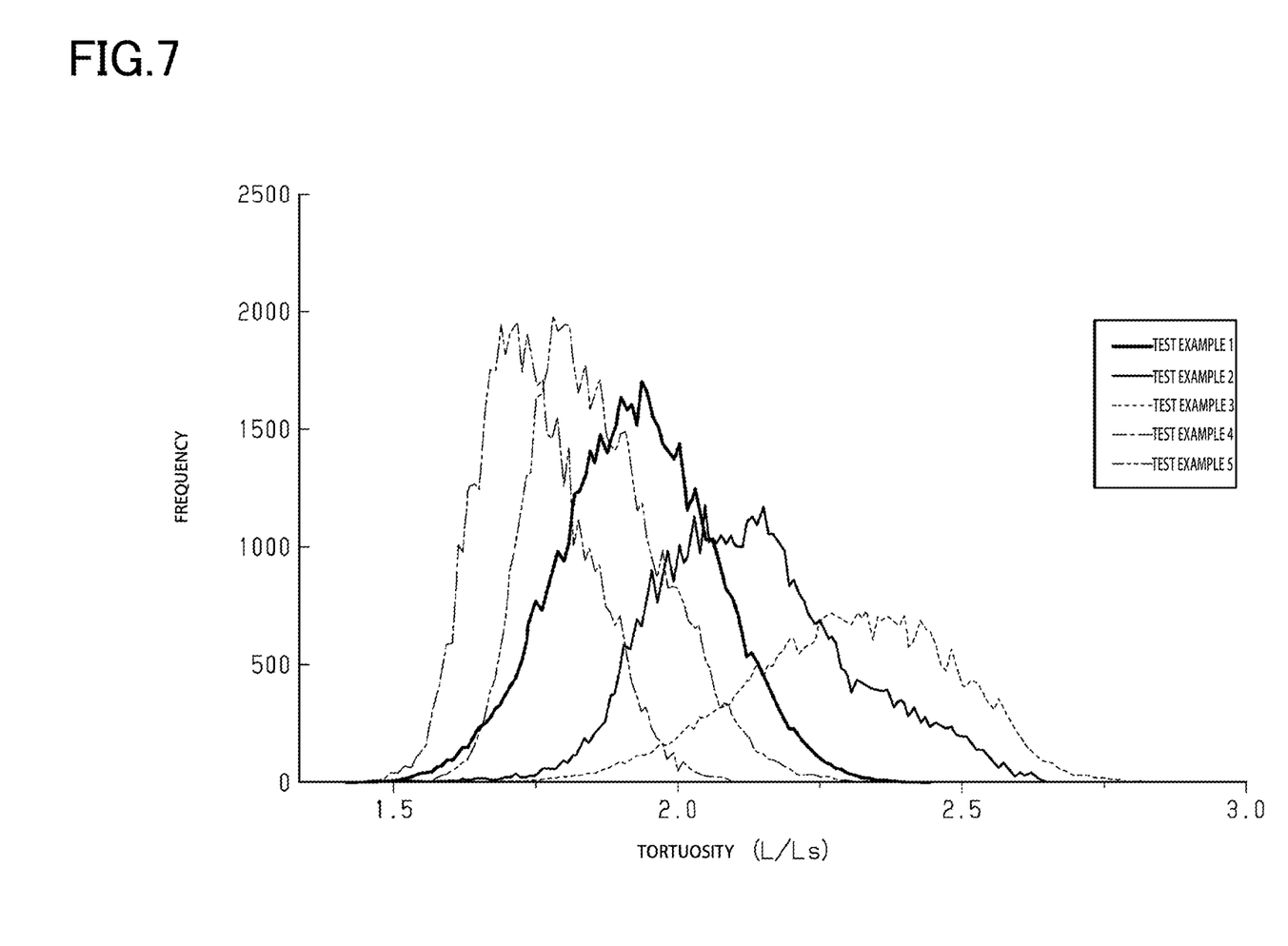
FIG. 7 is a histogram of tortuosity of electrode catalyst layers according to Test Examples.

Test Examples of the membrane electrode assembly will be described with reference to FIG. 7 and Table 1.

Test Example 1

A carbon-supported platinum catalyst (TEC10E50E manufactured by Tanaka Kikinzoku Kogyo K.K.), water, 1-propanol, polymer electrolyte (Nafion (registered trademark) dispersed liquid manufactured by Wako Pure Chemical Industries, Ltd.), and vapor-grown fibrous material (VGCF (registered trademark) manufactured by Showa Denko K.K.) were mixed. The mixture was subjected to a dispersion process for 30 minutes using a planetary ball mill having a ball diameter of 3 mm. Thus, the catalyst layer slurry was prepared. At this time, the solid content ratio in the catalyst layer slurry was set to 10% by mass. Additionally, the mass ratio of water and propanol was set to 1:1. The rotational speed of the planetary ball mill was set to 600 rpm.

The catalyst layer slurry was applied to the surfaces of the polymer electrolyte membrane (Nafion (registered trademark) 211, manufactured by Dupont) using a slit die coater. Subsequently, the catalyst layer slurry was placed in a warm air oven at 80° C., and the catalyst layer slurry was dried until the catalyst layer slurry became tack-free or non-sticky. Thus, the membrane electrode assembly of Example 1 was obtained.

Test Example 2

The membrane electrode assembly of Test Example 2 was obtained by the same method as in Test Example 1 except that the rotational speed of the planetary ball mill in Test Example 1 was increased.

Test Example 3

The membrane electrode assembly of Test Example 3 was obtained by the same method as in Test Example 2 except that the time period during which the dispersion process was performed in Test Example 2 was increased.

Test Example 4

The membrane electrode assembly of Test Example 4 was obtained by the same method as in Test Example 1 except that the vapor-grown fibrous material in Test Example 1 was not added.

Test Example 5

The membrane electrode assembly of Test Example 5 was obtained by the same method as in Test Example 1 except that the rotational speed of the planetary ball mill in Test Example 1 was decreased.

Evaluation Method

Calculation of Number of Branches

The configuration of the cathode-side electrode catalyst layer included in the membrane electrode assembly according to Test Example 1 to Test Example 5 was analyzed using 3D-SEM. A unit volume defined as 3.9 µm×3.9 µm×4.4 µm was set in a region excluding the surface of each of the cathode-side electrode catalyst layers, and the sum of the number of branches per unit volume was calculated.

Calculation of Tortuosity

The tortuosity per unit volume was calculated. In calculating the tortuosity, the lengths of 50000 through passages were measured. The histogram of the tortuosity of each of the cathode-side electrode catalyst layers was created with the class width set to 0.01.

Measurement of Maximum Power Density

Porous carbon sheets were placed on both sides of each membrane electrode assembly as gas diffusion layers, which was then sandwiched between a pair of separators, so that polymer electrolyte fuel cells for evaluation were obtained. The power density was measured as the power generation performance of each polymer electrolyte fuel cell using a single cell power generation evaluator. At this time, pure hydrogen gas (100% RH) was supplied to the anode-side electrode catalyst layer as the fuel gas, and air (100% RH) was supplied to the cathode-side electrode catalyst layer as the oxidant gas. The temperature in the polymer electrolyte fuel cell was set to 80° C., and the maximum power density was measured.

Evaluation Results

The histograms of the tortuosity of the cathode-side electrode catalyst layers according to Test Example 1 to Test Example 5 were created. The mode value, width, full width at half maximum, standard deviation, quartile deviation, and maximum inclination of the tortuosity of the cathode-side electrode catalyst layers according to Test Example 1 to Test Example 5 were calculated. Additionally, the number of branches in the cathode-side electrode catalyst layers according to Test Example 1 to Test Example 5 was calculated. The calculation results of the number of branches, the mode value, the width, the full width at half maximum, the standard deviation, the quartile deviation, and the maximum inclination were as shown in Table 1. The results of measuring the maximum output density of the polymer electrolyte fuel cells provided with the electrode catalyst layers of Test Examples 1 to 5 are as shown in Table 1 below.

TABLE 1

| | Number of branches | Mode value | Width | Full width at half maximum | Standard deviation | Quartile deviation | Maximum inclination | Maximum power density (mW/cm²) |
|---|---|---|---|---|---|---|---|---|
| Test Example 1 | 12553 | 1.87 | 1.14 | 0.30 | 0.15 | 0.10 | 9400 | 923 |
| Test Example 2 | 10773 | 2.08 | 1.42 | 0.38 | 0.19 | 0.13 | 7360 | 856 |
| Test Example 3 | 8103 | 2.30 | 1.50 | 0.72 | 0.36 | 0.23 | 4160 | 751 |
| Test Example 4 | 14376 | 1.62 | 0.85 | 0.22 | 0.11 | 0.07 | 16120 | 635 |
| Test Example 5 | 15002 | 1.75 | 0.98 | 0.26 | 0.13 | 0.09 | 15160 | 705 |

As shown in Table 1, it was found that the number of branches was 12553 in Test Example 1, 10773 in Test Example 2, and 8103 in Test Example 3. Additionally, it was found that the number of branches was 14376 in Test Example 4 and 15002 in Test Example 5.

It was found that the mode value was 1.87 in Test Example 1, 2.08 in Test Example 2, and 2.30 in Test Example 3. It was found that the mode value was 1.62 in Test Example 4 and 1.75 in Test Example 5.

Furthermore, the width of the tortuosity was 1.14 in Test Example 1, 1.42 in Test Example 2, and 1.50 in Test Example 3. The width of the tortuosity was 0.85 in Test Example 4 and 0.98 in Test Example 5.

It was found that the full width at half maximum was 0.30 in Test Example 1, 0.38 in Test Example 2, and 0.72 in Test Example 3. Additionally, it was found that the full width at half maximum was 0.22 in Test Example 4 and 0.26 in Test Example 5.

It was found that the standard deviation was 0.15 in Test Example 1, 0.19 in Test Example 2, and 0.36 in Test Example 3. Additionally, it was found that the standard deviation was 0.11 in Test Example 4 and 0.13 in Test Example 5.

It was found that the quartile deviation was 0.10 in Test Example 1, 0.13 in Test Example 2, and 0.23 in Test Example 6. Additionally, it was found that the quartile deviation was 0.07 in Test Example 4 and 0.09 in Test Example 5.

It was found that the maximum inclination was 9400 in Test Example 1, 7360 in Test Example 2, and 4160 in Test Example 3. Additionally, it was found that the maximum inclination was 16120 in Test Example 4 and 15160 in Test Example 5.

As shown in Table 1, the maximum power density was 923 mW/cm² in Test Example 1, 856 mW/cm² in Test Example 2, and 751 mW/cm² in Test Example 3. Additionally, the maximum power density was 635 mW/cm² in Test Example 4 and 705 mW/cm² in Test Example 5.

As described above, it was found that the maximum power density in Test Examples 1 and 2 was higher than the maximum power density in Test Examples 3 to 5. That is, the electrode catalyst layer having the branches the number of which is 8500 or more and 13000 or less inhibits flooding in the polymer electrolyte fuel cell and thus improves the power generation performance.

Note that, although the mode value and the width of the tortuosity in Test Examples 1 and 2 are smaller than the mode value and the width of the tortuosity of the membrane electrode assembly in Test Example 3, the number of branches in Test Examples 1 and 2 is greater than that in Test Example 3. This indicates that the maximum power density in Test Examples 1 and 2 is greater than that in Test Example 3. More specifically, the maximum power density is high in Test Examples 1 and 2 since the number of reaction points per unit volume in the electrode catalyst layer is great.

As described above, the electrode catalyst layer, the membrane electrode assembly, and the polymer electrolyte fuel cell according to the embodiment achieve the following advantageous effects.

(1) The number of reaction points included in the electrode catalyst layer 12 is increased compared with a case in which the number of branches per unit volume in the electrode catalyst layer 12 is less than 8500. This prevents hindering of the increase in the output of the polymer electrolyte fuel cell due to an insufficient number of reaction points. This also prevents hindering of the gas diffusion and the water discharge in the electrode catalyst layer 12 compared with a case in which the number of branches per unit volume of the electrode catalyst layer 12 is greater than 13000. As a result, flooding in the electrode catalyst layer 12 is inhibited, so that the power generation performance is improved.

(2) Since the electrode catalyst layer 12 is permitted to include the closed branch and the branchlet, the three-dimensional network of the flow paths 12F is easily formed in the electrode catalyst layer 12.

(3) Since the mode value of the histogram of the tortuosity is 1.8 or more, the number of reaction points is prevented from being decreased to a degree that the output of the polymer electrolyte fuel cell 30 is hindered from increasing at the first stage of operating the polymer electrolyte fuel cell. Additionally, since the mode value in the histogram of the tortuosity is 2.8 or less, the gas diffusion and the water discharge in the electrode catalyst layer 12 are prevented from being hindered at the first stage of operating the polymer electrolyte fuel cell 30 due to excessively long length of the through passages 12F1 included in the electrode catalyst layer 12. As a result, the operating efficiency of the polymer electrolyte fuel cell 30 including the electrode catalyst layers 12 is improved.

(4) Since the width of the tortuosity of the plurality of through passages 12F1 included in the electrode catalyst layer 12 is 1.14 or more and 1.50 or less, the flow paths having a relatively high water discharge performance and the flow paths having a relatively great number of reaction points are both included in the plurality of flow paths 12F. This inhibits flooding in the electrode catalyst layer 12, so that the power generation performance of the polymer electrolyte fuel cell 30 including the electrode catalyst layers 12 is improved.

(5) Since the standard deviation of the tortuosity of the plurality of through passages 12F1 included in the electrode catalyst layer 12 is 0.15 or more and 0.20 or less, the length of the through passages 12F1 has a significant variance. Thus, the electrode catalyst layer 12 includes the through passages 12F1 that are relatively short and have high gas diffusivity and high water discharge performance and the through passages 12F1 that are relatively long and have many reaction points. As a result, the water discharge performance and the power generation performance of the polymer electrolyte fuel cell including the electrode catalyst layers 12 are improved.

(6) The tortuosity has variance between the first quartile 44 and the third quartile 45, which sandwich the median value of the tortuosity. This inhibits the tortuosity of the plurality of through passages 12F1 from concentrating around the median value. That is, the plurality of through passages 12F1 of the electrode catalyst layer 12 include the through passages 12F1 that are relatively short and have high gas diffusivity and high water discharge performance and the through passages 12F1 that are relatively long and have many reaction points. As a result, the water discharge performance and the power generation performance of the polymer electrolyte fuel cell including the electrode catalyst layers 12 are further improved.

(7) As long as the maximum inclination is 4200 or more and 10000 or less, the electrode catalyst layer 12 is prevented from including only the through passages 12F1 included in a specific range of the tortuosity while providing a variance in the distribution of the tortuosity of the plurality of through passages 12F1 included in the electrode catalyst layer 12. Thus, the through passages 12F1 that are relatively short and have high gas diffusivity and high water discharge performance and the through passages 12F1 that are relatively long and have many reaction points are easily included in the electrode catalyst layer 12.

It should be noted that the aforementioned embodiment can be modified as follows.

Tortuosity

The tortuosity of the electrode catalyst layer 12 does not necessarily have to satisfy at least one of Conditions 2 to 7. Also in this case, as long as the electrode catalyst layer 12 satisfies Condition 1, an advantageous effect similar to the above advantageous effect (1) is achieved.

Flow Paths

The flow paths 12F do not necessarily have to include the closed branch and the branchlet. It is possible to obtain the electrode catalyst layer 12 in which the closed branch is not included per unit volume or the electrode catalyst layer 12 in which the branchlet is not included in a surface of the electrode catalyst layer other than the first surface S1 and the second surface S2 by adjusting the size and formulation ratio of the fibrous material 24, the size and formulation ratio of the conductive substance, and the formulation ratio of the polymer electrolyte as required.

What is claimed is:

1. An electrode catalyst layer configured to be bonded to a polymer electrolyte membrane in a polymer electrolyte fuel cell, the electrode catalyst layer, comprising:
   a catalyst material;
   a conductive carrier, which supports the catalyst material;
   a polymer electrolyte; and
   a fibrous material, wherein
   the electrode catalyst layer includes a three-dimensional network of a flow path,
   the flow path includes a plurality of terminal points and a plurality of branches, and each of the branches is an elongated hole connecting a pair of the terminal points,
   the branches include a bifurcated branch, one of the pair of the terminal points of the bifurcated branch is connected to another of the branches, and
   a number of the branches per unit volume of the electrode catalyst layer is 8500 or more and 13000 or less, and the unit volume is defined as 3.9 μm×3.9 μm×4.4 μm, and
   wherein the electrode catalyst layer includes a first surface, a second surface which is a surface facing away from the first surface, and a plurality of through passages which extend from the first surface to the second surface,
   a value obtained by dividing a length of each of the through passages by a thickness of the electrode catalyst layer is a tortuosity, and
   in a histogram of the tortuosity with a class width of 0.01, a mode value is 1.8 or more and 2.8 or less.

2. The electrode catalyst layer of claim 1, wherein the plurality of branches include a closed branch and a branchlet, one of the pair of the terminal points of the closed branch is not connected to another of the branches, and at least one of the pair of the terminal points of the branchlet is located on a surface of the electrode catalyst layer.

3. The electrode catalyst layer of claim 1, wherein a value obtained by subtracting a minimum value of the tortuosity from a maximum value of the tortuosity is a width of the tortuosity, and
   the width of the tortuosity is 1.14 or more and 1.50 or less.

4. The electrode catalyst layer of claim 3, wherein the histogram of the tortuosity has a full width at half maximum of the tortuosity of 0.30 or more and 0.40 or less.

5. The electrode catalyst layer of claim 3, wherein the tortuosity has a standard deviation of 0.15 or more and 0.20 or less.

6. The electrode catalyst layer of claim 3, wherein the tortuosity has a quartile deviation of 0.10 or more and 0.15 or less.

7. The electrode catalyst layer of claim 3, wherein the histogram includes a first tortuosity, which corresponds to a first class, and a second tortuosity, which corresponds to a second class different from the first class, and a difference between the first tortuosity and the second tortuosity is 0.05,
   a change rate of a value obtained by subtracting a second frequency of the second tortuosity from a first frequency of the first tortuosity with respect to the difference is an inclination of a straight line that passes through a first point, which is determined by the first tortuosity and the first frequency, and a second point, which is determined by the second tortuosity and the second frequency,
   a maximum value of absolute values of a plurality of inclinations, each of the inclinations is calculated per class, is a maximum inclination, and the maximum inclination is 4200 or more and 10000 or less.

8. A membrane electrode assembly, comprising:
a polymer electrolyte membrane; and
the electrode catalyst layer according to claim 1, wherein the electrode catalyst layer is bonded to the polymer electrolyte membrane.

9. A polymer electrolyte fuel cell comprising the membrane electrode assembly of claim 8.

* * * * *